United States Patent
Nishizawa et al.

[11] Patent Number: 5,969,302
[45] Date of Patent: Oct. 19, 1999

[54] LIFT CONTROL MECHANISM AND METHOD

[75] Inventors: Kazumi Nishizawa; Yutaka Izumida, both of Tokyo; Hitoshi Fujisawa, Kanagawa, all of Japan

[73] Assignees: Pabco Co., Ltd., Kanagawa; Nikko Electric Industry Co., Ltd., Tokyo, both of Japan

[21] Appl. No.: 08/825,563

[22] Filed: Mar. 31, 1997

[30] Foreign Application Priority Data

Sep. 25, 1996 [JP] Japan .................................. 8-272914

[51] Int. Cl.$^6$ ................ B66B 1/28; B66B 9/16; B60P 1/00
[52] U.S. Cl. ........................ 187/285; 414/556; 197/240
[58] Field of Search ...................... 187/240, 222, 187/242, 285, 286; 414/556, 557, 558

[56] References Cited

U.S. PATENT DOCUMENTS

| | | | |
|---|---|---|---|
| 3,614,567 | 10/1971 | Payne | 318/305 |
| 4,358,989 | 11/1982 | Tordenmaim | 91/361 |
| 4,395,187 | 7/1983 | Corley | 414/557 |
| 4,517,645 | 5/1985 | Yuki et al. | 364/424 |
| 5,022,496 | 6/1991 | Klopfleisch et al. | 187/9 |
| 5,255,517 | 10/1993 | Weber | 60/431 |
| 5,266,756 | 11/1993 | Hatono | 187/111 |
| 5,333,533 | 8/1994 | Hosseini | 91/361 |

FOREIGN PATENT DOCUMENTS

| | | |
|---|---|---|
| 3630850 | 9/1986 | Germany . |
| 4430437 | 8/1994 | Germany . |
| 91/10577 | 1/1991 | WIPO . |

*Primary Examiner*—Robert E. Nappi
*Attorney, Agent, or Firm*—Majestic, Parsons, Siebert & Hsue, P.C.

[57] ABSTRACT

A lift attached to a truck has a tail gate supported by at least one hydraulic lift and at least one tilt cylinder for respectively lifting the tail gate as a whole and rotating it for opening and closing. A control system for moving such a tail gate up and down as a whole and rotating it to open and close it is provided with a power unit including a hydraulic pump, an electric motor for the hydraulic pump, and a plurality of valves for selectably allowing or not allowing transport of a hydraulic liquid by the hydraulic pump into the hydraulic cylinders, a sensor for measuring the pressure inside the hydraulic pump, external switches, and a controller which includes a CPU, a timer and a semiconductor switch and serves to calculate on real time the speed of the tail gate from signals from the sensor and the timer. The position of the tail gate is accurately determined therefrom and the tail gate is gradually started, accelerated and decelerated to prevent damage to its cargo.

13 Claims, 9 Drawing Sheets

LIFT CONTROL MECHANISM AND METHOD

BACKGROUND OF THE INVENTION

This invention relates to the control of a freight lift of the kind attached to a back part of a freight truck for transporting freight up into and down from the truck. More particularly, the invention relates to a mechanism and a method for controlling the upward and downward translational motion of its freight-receiving table (herein referred to as "the tail gate").

FIGS. 2A and 2B show a lift of the type related to this invention, attached to a back part of a freight truck. Such a lift generally makes use of a mechanism comprising a plurality of lift cylinders for moving the tail gate up and down translationally as a whole and a plurality of tilt cylinders for rotating it around a horizontal axis between its opened and closed positions.

FIG. 3 shows a portion of a gate-lifting mechanism 30 of such a lift, comprising a tail gate 31, a lift cylinder 32 with a piston, a main arm 36 and an attachment bracket 38. One end of the lift cylinder 32 is axially connected to the main arm 36 around a pin 34, the other end being axially attached to the attachment bracket 38. Similarly, one end of the main arm is axially connected to the tail gate 31 around a pin 33, the other end being axially attached to the attachment bracket 38 around a pin 35. The attachment bracket 38 is welded to the chassis 37 of the truck.

The lifting motion (both upward and downward) of the tail gate 31 as a whole is effected by a parallelogram link mechanism formed by pins 33, 33', 35 and 35'. Although not shown in FIG. 3 for the sake of clarity, a tilt cylinder for causing the tail gate 31 to rotate (or tilt) around the pin 33 is axially supported between the pins 33' and 35'. While the tail gate 31 is being lifted up and down, the tilt cylinder keeps its length constant and serves, together with the main arm 36, as a part of a parallel link. When the tail gate 31 is lifted up as a whole (as opposed to being lifted up by rotating around the pin 33), a hydraulic liquid (referred to as "the oil") is introduced from a hydraulic pump into one of the oil chambers inside the lift cylinder 32, causing its piston to be extended outward, such that the tail gate 31 is lifted gradually from the position (b) to the position (a) indicated in FIG. 3 while maintaining the parallel link. When the tail gate 31 is lowered as a whole, the oil inside the oil chamber of the lift cylinder 32 is returned to the hydraulic pump, causing the pressure inside the cylinder to drop. The piston of the lift cylinder 32 is thereby returned to its original position, and the tail gate 31 moves down from the position (a) to the position (b), again by maintaining the parallel link. In summary, the up-and-down lifting motion of the gate-lifting mechanism 30 is effected by the reciprocating motion of the piston of the lift cylinder 32.

This operation of the lift cylinder 32, as described above, is controlled by a hydraulic pump, a power unit which may include an electric motor for driving this hydraulic pump as well as solenoid valves, and an electrical control system.

With a prior art lift of this type, an accurate control of its up-and-down motion was difficult because the speed of motion of the tail gate was significantly affected by the load thereon. As a result, the motion of the tail gate was abrupt, starting and stopping with a jerk, causing damage to the cargo being transported thereon. When the tail gate is lowered, furthermore, it tended to hit the ground with a large force which would damage the tail gate itself, affecting adversely the useful lifetime of the equipment.

In addition, a prior art lift of this type had to be operated manually when the tail gate was to be stopped in the middle of its trajectory. This means that the motion of the tail gate had to be started and stopped many times until it reaches a desired height. It also goes without saying that abrupt starting and stopping of the tail gate are not desirable practice from the point of view of safety to the workers.

SUMMARY OF THE INVENTION

It is therefore an object of this invention to provide a system and method for controlling the up-and-down translational motion of the tail gate of a freight lift such that the motion can be started and stopped accurately and gently.

It is another object of this invention to provide such a control system and method capable of preventing the tail gate from banging on the ground when it is landed such that the damage to the cargo as well as to the gate itself can be reduced to a minimum.

It is still another object of this invention to provide such a control system and method capable of stopping the tail gate gently at a specified height and also of stopping it gently at its highest position even when the motion is started not from the ground level.

It is a further object of this invention to provide such a control system and method which are not costly and yet capable of improving safety of the work.

A control system embodying this invention, with which the above and other objects can be accomplished, may be characterized as comprising a power unit including a hydraulic pump, an electric motor for the hydraulic pump, and a plurality of valves for selectably allowing or not allowing transport of a hydraulic liquid into the hydraulic cylinders by the hydraulic pump, a sensor for measuring the pressure inside the hydraulic pump, external switches, and a controller which serves to transmit output signals to the motor and to the valves in response to input signals from the sensor and the external switches and is capable of starting and stopping the translational motion of the tail gate gradually.

According to a preferred embodiment of the invention, the aforementioned plurality of valves include a main valve, a tilt valve and a lift valve. The main valve is disposed between the hydraulic pump and each of the hydraulic cylinders. The tilt valve is disposed between the main valve and the tilt cylinder. The lift valve is disposed between the main valve and the lift cylinder.

The controller, according to a preferable embodiment, includes a signal generating device for generating a rectangular wave signal in response to an input signal received from a pressure sensor and a timer and a semiconductor switch which switches on and off in synchronism with this rectangular wave signal. The controller changes the duty ratio of the rectangular wave signal to thereby control the speed of the tail gate in its translational motion.

A method of this invention for using such a control system to cause the tail gate to undergo a downward translational motion may be characterized as comprising the steps of gradually starting this downward motion and gradually accelerating the tail gate, determining the position of the tail gate on real time as a one-dimensional position coordinate with respect to a reference position, and gradually decelerating the tail gate after its position coordinate passes a predetermined value. In the above, the real-time determination of the coordinate may be carried out preferably by calculating the flow rate of oil from one of oil chambers of the lift cylinder from the pressure and the duty ratio of a valve connected to the lift cylinder, calculating the speed of the tail gate from the calculated flow rate, calculating the distance travelled by the tail gate by using a curve which relates the calculated speed of the tail gate with time, and calculating the current position coordinate of the tail gate from the position coordinate of the reference position which has been stored and the calculated distance.

A method of this invention for using such a control system to cause the tail gate to undergo an upward translational motion may be characterized as comprising the steps of gradually starting the upward movement of the tail gate and gradually accelerating it, determining the position of the tail gate on real time, as explained above, as a one-dimensional position coordinate with respect to a reference position, gradually decelerating this motion when the calculated position coordinate of the tail gate reaches a predetermined value, and stopping the motion while decelerating it.

Another method of this invention for using such a control system to cause the tail gate to undergo an upward translational motion may be characterized as comprising the steps of gradually starting the upward motion of the tail gate and gradually accelerating it, determining a start-decelerating time and a stopping time from the position and speed of the tail gate, beginning to gradually decelerate the tail gate when the start-decelerating time is reached, and stopping the tail gate while decelerating it when the stopping time is reached.

In these methods, the gradual starting, accelerating and decelerating steps may be effected by changing the duty ratio of the rectangular wave signal or the voltage applied to the motor which activates the hydraulic pump.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

DETAILED DESCRIPTION OF THE INVENTION

Figure 1:
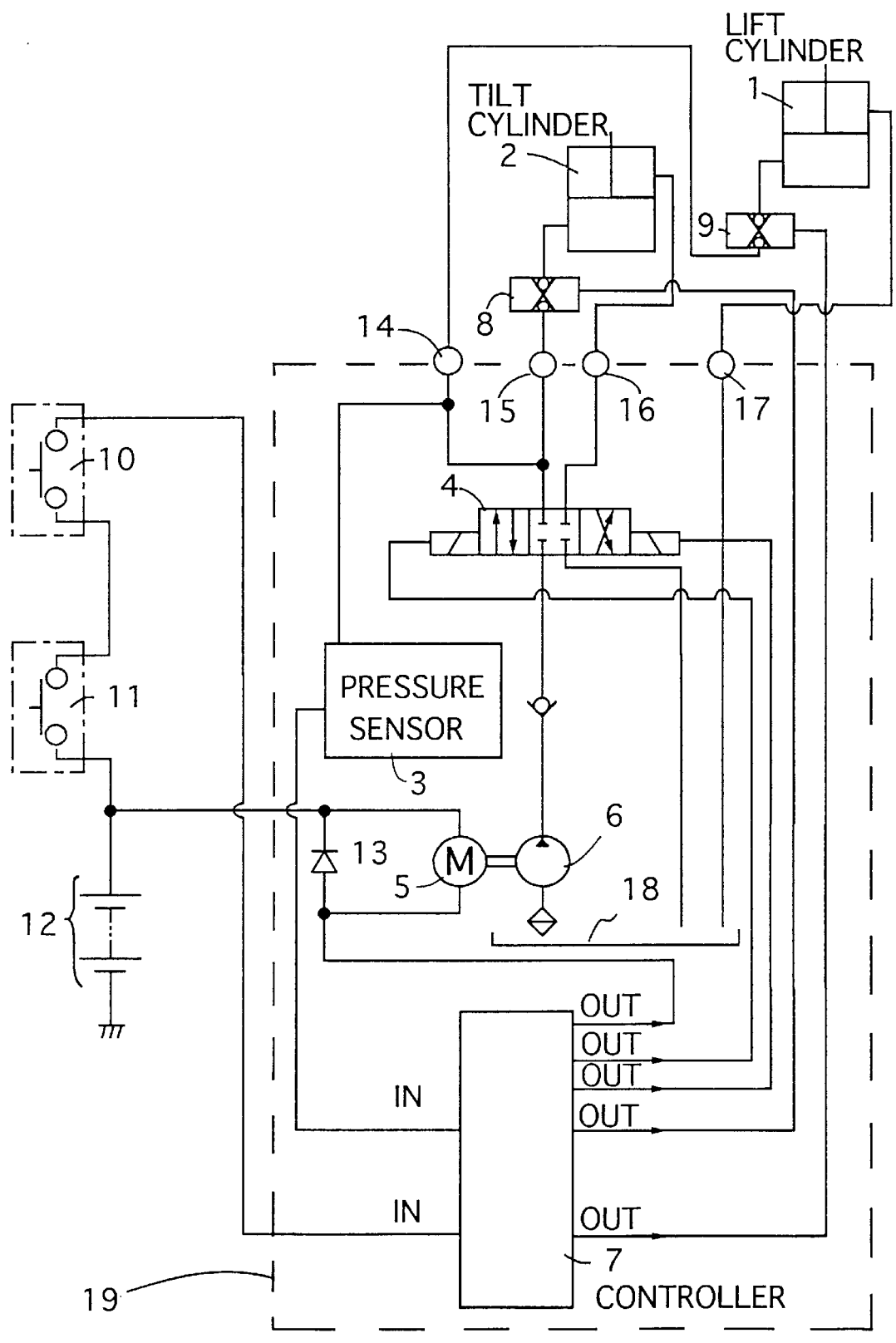
FIG. 1 is a circuit diagram of a control system embodying this invention for controlling the operation of a freight lift.
Figure 2B:
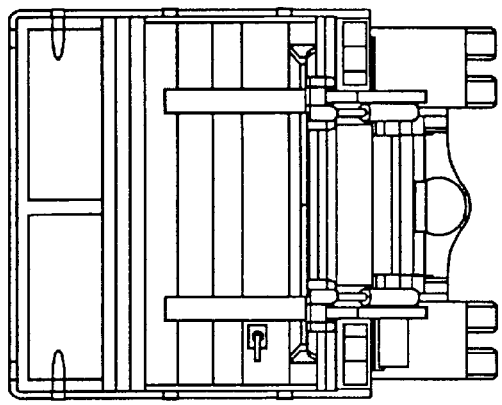
FIGS. 2A and 2B are side and back views of a truck with a freight lift which may be controlled according to this invention.
Figure 2A:
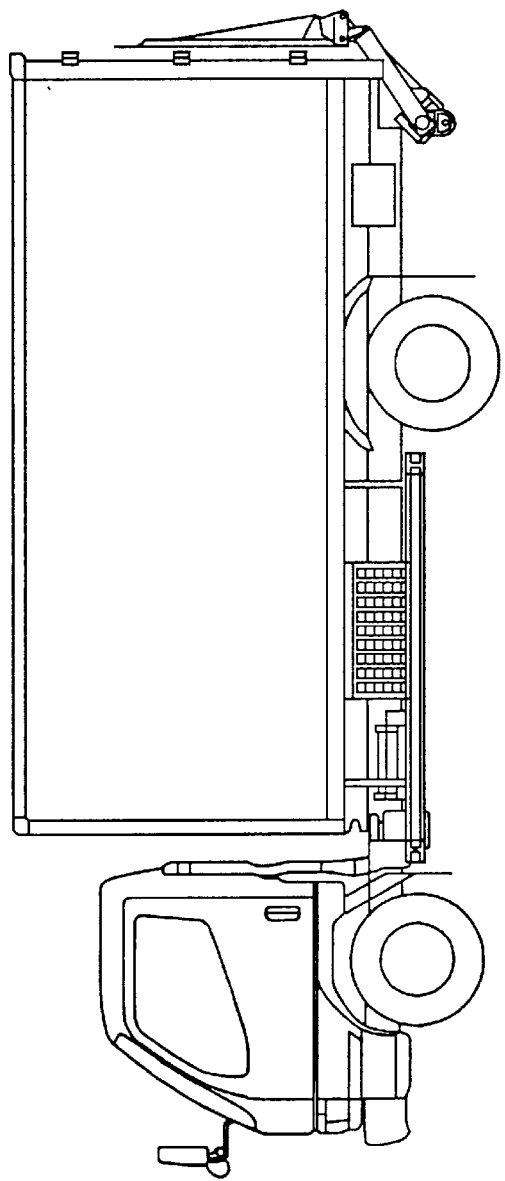

FIG. 1 is a circuit diagram of a control system according to a preferred embodiment of this invention for controlling the lifting and tilting operations of a lift having a tail gate which is supported by at least one hydraulic cylinder (referred to as the lift cylinder 1) for moving it up and down as a whole and at least another hydraulic cylinder (referred to as the tilt cylinder 2) for tilting it and thereby opening and closing it. The system further includes a hydraulic pump 6, an electric motor 5, a pressure sensor 3, a controller 7, a main valve 4, a tilt valve 8, a lift valve 9, external switches 10 and 11, a power source 12, a flywheel diode 13, ports 14, 15, 16 and 17, and an oil tank 18. The hydraulic pump 6, the motor 5, the main valve 4, and the controller 7 may be considered to together form a power unit 19 serving as the power source for the lift cylinder 1 and the tilt cylinder 2. Both the lift cylinder 1 and the tilt cylinder 2 are a hydraulic cylinder, each serving to cause its piston to undergo a reciprocating motion by means of a hydraulic operating liquid (referred to as "the oil") supplied through the hydraulic pump 6. The main valve 4, the tilt valve 8 and the lift valve 9 are each a solenoid valve, controlled by signals outputted from the controller 7. One end of the tilt valve 8 is connected to one of the oil chambers of the tilt cylinder 3, and its other end is connected to the main valve 4. One end of the lift valve 9 is connected to one of the oil chambers of the lift cylinder 1, and its other end is connected to the main valve 4. The pressure sensor 3 comprises a piezoelectric element adapted to convert pressure into an electrical signal, being an analog element outputting signals at different levels, depending on the magnitude of pressure. One end of the pressure sensor 3 is near the lift valve 9 of the lift cylinder 1, and its other end is connected to an input port of the controller 7. Another accessory pressure sensor (not shown in FIG. 1) may be used auxiliarily for detecting the pressure inside the tilt cylinder 2. The external switches 10 and 11 are connected in series such that the operation of the system as a whole will stop if either of them is switched off. They may be ordinary button switches, one of them set to be operated from the driver's seat and the other set at a back part of the truck. The number of the external switches is not intended to limit the scope of the invention. There may be only one external switch, and there may be three or more connected in series.

The controller 7 has many functions, as will be described in detail below, and is adapted to transmit control signals to the motor 5, the main valve 4, the tilt valve 8 and the lift valve 9 in response to signals received from the pressure sensor 3 and the external switches 10 and 11. The flywheel diode 13 is for the purpose of absorbing the surge voltage immediately after the motor 5 is switched off. The motor 5 and the hydraulic pump 6 are connected by means of a coupler.

If the motor 5 is activated to operate the hydraulic pump, the oil inside the oil tank 18 is passed through the main valve 4 and is selectably guided through either the port 14 or 15. The oil is then directed through either the tilt valve 8 or the lift valve 9 into one of the oil chambers inside either the tilt cylinder 2 or the lift cylinder 1, thereby pushing its piston outward. This causes the oil inside the other oil chamber to return to the oil tank 18 either through the port 16 or 17 and directly thereafter or through the main valve 4.

One of the distinct characteristics of the control system according to this invention is that use is made of the pressure sensor 3. Throughout the period during which the tail gate undergoes a lifting motion (upward or downward), the pressure sensor 3 monitors the pressure inside the lift cylinder 1 and transmits analog signals indicative of the detected pressure inside to the controller 7. As will be described in detail below, the controller 7 serves to control on real time the motor 5, the main valve 4, the tilt valve 8 and the lift valve 9 in response to these signals from the pressure sensor 3.

Another distinct characteristic of the control system according to this invention is that it contains the controller 7, which, cooperating with the pressure sensor 3, makes it possible to start and stop the lifting motion of the tail gate gently.

A third distinct characteristic of the control system according to this invention is that as many as three valves (the main valve 4, the tilt valve 8 and the lift valve 9) are used in the system. Moreover, as symbolically shown in FIG. 1, the tilt valve 8 and the lift valve 9 are disposed proximally to the tilt cylinder 2 and the lift cylinder 1, respectively, and are directly connected to one of the oil chambers inside the corresponding cylinder. With the valves thus arranged, the tilt and lift cylinders can be controlled independently of each other and, if a crack is generated in a oil pipe, the occurrence of accident caused by a sudden drop in hydraulic pressure can be prevented.

Figure 4:
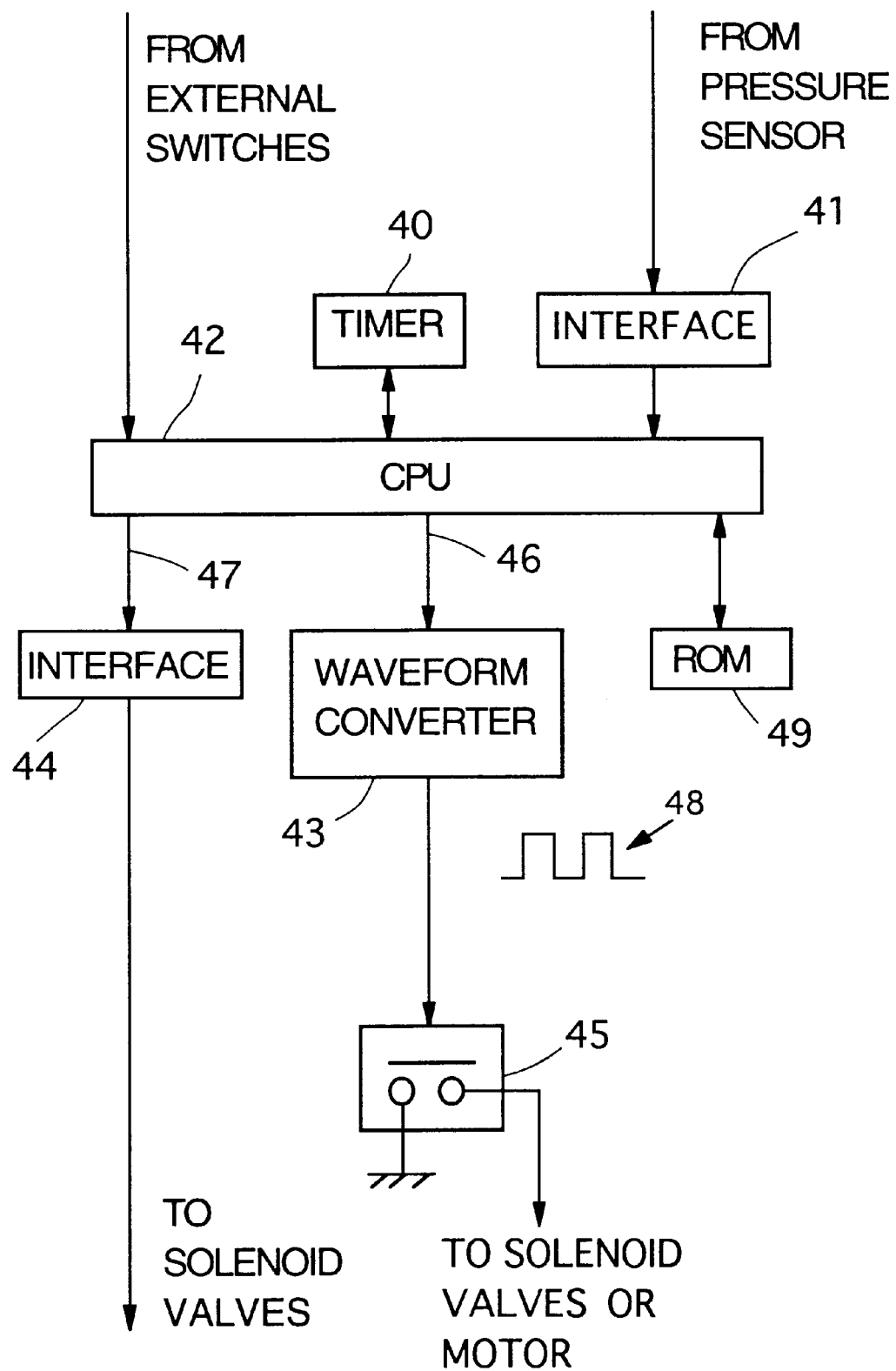
FIG. 4 is a block diagram of the controller of FIG. 1.

As shown in FIG. 4, the controller 7 comprises a central processing unit (CPU) 42, a waveform converter 43, a semiconductor switch 45, a memory (ROM) 49, a timer 40 and interfaces 41 and 44. Analog signals from the pressure sensor 3 are converted by the interface 41 into digital signals before they are inputted to the CPU 42, which accepts the signals from the pressure sensor 3 in synchronism with the clock signals from the timer 40. ON/OFF signals from the external switches 10 and 11 are also received by the CPU 42. The CPU 42 responds to the signals from the pressure sensor 3 and the timer 40 according to a program preliminarily stored in the memory (ROM) 49 by analyzing the position coordinates of the tail gate on real time and outputting signals 46 and 47 for controlling the motor 5 and the solenoid valves 4, 8 and 9. Signals 46 for controlling the motor 5 or the solenoid valves 4, 8 and 9 are converted into a rectangular wave 48. Signals 47 to the solenoid valves 4, 8 and 9 are transmitted through the interface 44. The rectangular wave 48 generated by the waveform converter 43 serves to switch on and off the semiconductor switch 45. The frequency of the rectangular wave 48 perfectly matches that of the switching frequency of the semiconductor switch 45, and they are in synchronism with each other.

Figure 5A:
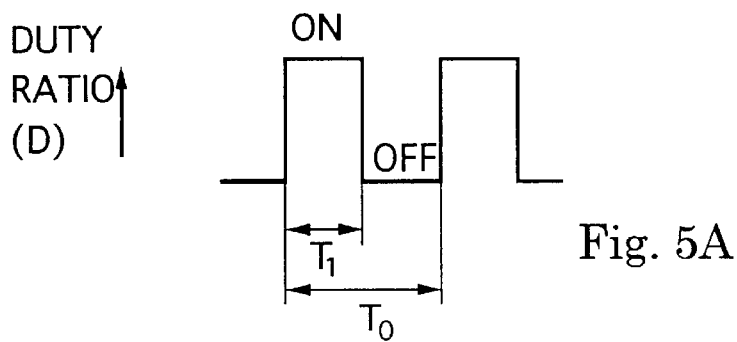
FIGS. 5A, 5B, 5C and 5D are graphs of duty ratio and how it changes in different processes according to this invention.

The principle of control of the lift valve 9 and the motor 5 according to this invention will be explained next with reference to FIG. 5A, which shows a portion of the rectangular wave 48 generated by the waveform converter 43. The hill parts of the wave represent periods of time during which the power source for the motor 5 is on, and the lift valve 9 is open. The valley parts represent periods of time during which the power source is off, and the lift valve 9 is closed. $T_0$ indicates the period of the wave, and $T_1$ indicates the duration of time per cycle during which the power source of the motor is on and the lift valve is open. Duty ratio D in units of percentage is defined by $D=100T_1/T_0$ and represents the average value of applied voltage, or the average cross-sectional area of the lift valve 9. In the case of the motor 5, for example, if a source of 200 v is used and the duty ratio is 50%, the average value of the applied voltage is 100 V. The duty ratio of a rectangular wave can be changed by changing its frequency. Since the rotary speed of a DC motor is generally proportional to the applied voltage, it is possible to control the rotary motion of a motor by controlling the duty ratio of a rectangular wave. Similarly, it is possible to control the cross-sectional area of the lift valve 9 by controlling the duty ratio of the rectangular wave 48. Throughout herein, therefore, expressions "duty ratio of the motor" and "duty ratio of the valve" will be used to indicate the manner of controlling the motor and the valve, respectively.

Figure 5B:
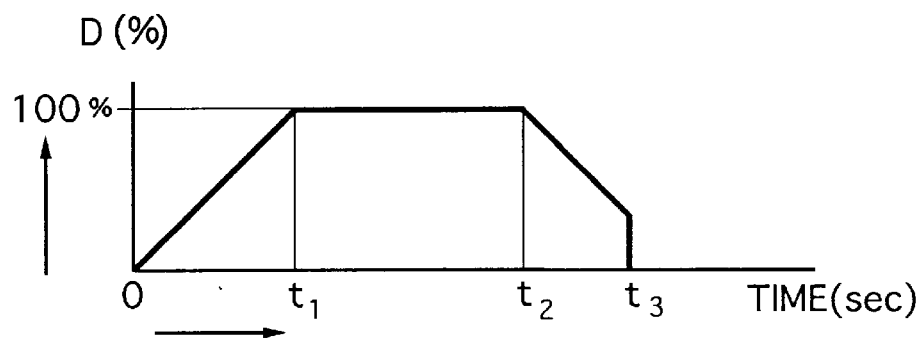

This principle is made use of by the control system shown in FIG. 1, with the duty ratio changed with time as shown in FIG. 5B. The control of the lifting motion of the tail gate will be explained next with reference to both FIGS. 1 and 3.

Let us consider first the downward motion of the tail gate. After the external switches 10 and 11 are switched on and the main valve 4 is opened, the duty ratio is gradually increased from 0% as shown in FIG. 5B. The lift valve 9 alternates between the closed condition and open condition slowly first but the period becomes gradually shorter. The tail gate 31 at the position of (a) in FIG. 3 begins to move down slowly, increasing its downward velocity gradually. The duty ratio becomes 100% at time $t_1$ as shown in FIG. 5B, and the lift valve 9 is now in the fully open condition. The tail gate 31 then travels at a constant speed from $t_1$ to $t_2$. At time $t_2$, the controller 7 is controlled such that the duty ratio is reduced at a constant rate, reducing also the cross-sectional area of the lift valve 9 such that the downward speed of the tail gate 31 diminishes gradually. When (at time $t_3$) the pressure sensor 3 detects the contact of the tail gate 31 with the ground at position (b) in FIG. 3, the controller 7 responds to the signal to this effect from the pressure sensor 3 by reducing the duty ratio to 0% as shown in FIG. 5B, thereby completely closing the lift valve 9. Immediately thereafter, the tilt valve 8 is opened such that the oil is returned from one of the oil chambers inside the tilt cylinder 2 to the oil tank 18 through the main valve 4. At the same time, the oil is guided into the other oil chamber of the tilt cylinder 2 such that its piston is retracted. As a result, the tail gate 31 is tilted downward from position (b) to position (c) in FIG. 3. Finally, the main valve 4 and the tilt valve 8 are both closed and the entire system is shut down.

Figure 3:
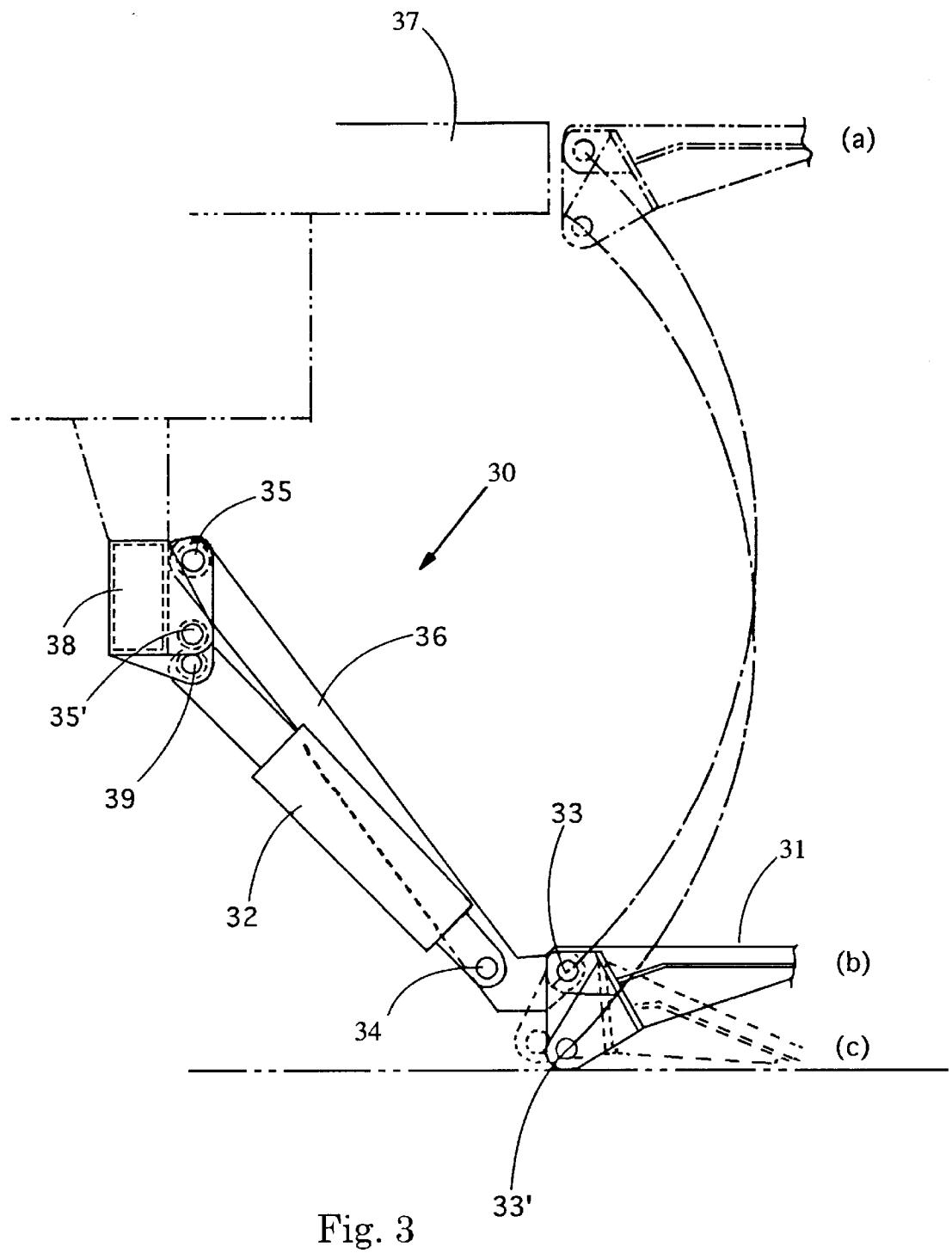
FIG. 3 is a side view of a gate-lifting mechanism which may be controlled according to this invention.

For moving the tail gate 31 upward from position (b) in FIG. 3, the external switches 10 and 11 are switched on to open the lift valve 9 and the main valve 4, and the duty ratio is again controlled to increase gradually from 0% as shown in FIG. 5B. The motor 5, which was initially at rest, gradually begins to turn, increasing its rotary speed steadily. Accordingly, the tail gate 31 begins to move upward from position (b) in FIG. 3, steadily increasing its speed upward. The duty ratio becomes 100% at time $t_1$ and the source voltage is thereafter directly applied to the motor 5, causing the tail gate 31 to move upward at a constant speed between time $t_1$ and $t_2$. After time $t_2$, the duty ratio is reduced as shown in FIG. 5B, and the speed of the tail gate diminishes gradually. When the tail gate 31 reaches at its highest position (a) in FIG. 3 at time $t_3$, the duty ratio is set to 0%, and after the lift valve 9 and the main valve 4 are closed, the system is shut down as a whole.

The method of control according to this invention is described next with reference to the flow charts in FIGS. 7, 8 and 9.

For controlling the downward motion of the tail gate, the first step is to clear the timer (Step Si) as the external switches are switched on to open the main valve. This is followed by the step of gradually increasing the duty ratio, thereby reducing the period of opening and closing the lift valve (Step S2) and the step of monitoring the signals from the pressure sensor and the duty ratio in synchronism with the clock signals from the timer and thereby calculating the distance x traveled by the tail gate (Step S3). The calculated distance x is added to the stored initial coordinate $x_0$ of the tail gate, and the sum $x+x_0$, which represents the coordinate of the present position of the tail gate, is compared with a specified pre-determined value (Step S4). Until the sum becomes greater than the specified value (NO in Step S4), the controller 7 keeps checking whether the pressure measured by the pressure sensor remains less than a pre-selected threshold value, say, 10 kg/cm2 (Step S5). As long as the measured pressure is greater than this threshold value (NO in Step S5), indicating that the tail gate has not come to rest on the ground yet, Steps S3 and S4 are repeated, unless either of the external switches is switched off (NO in Step S6). If the arrival of the tail gate at the position with the aforementioned specified coordinate value is ascertained (YES in Step 4), the duty ratio is reduced and the tail gate is decelerated (Step S7). This continues as long as the pressure measured by the pressure sensor is greater than the aforementioned threshold value (NO in Step S8). When the measured pressure becomes less than the threshold value (YES in Step S8), the lift valve is closed and the tilt valve is opened so as to slowly tilt the tail gate in the forward direction (Step S9), and then the entire operation of the system is stopped by closing all valves (Step S10). As soon as the tail gate comes to a stop, its position coordinate is stored (Step S11). It is to be noted that if the measured pressure drops below the threshold value in Step S5, the system is stopped without tilting the tail gate downward. This, for example, corresponds to a situation where the tail gate has hit an obstacle while it is being lowered.

Figure 5C:
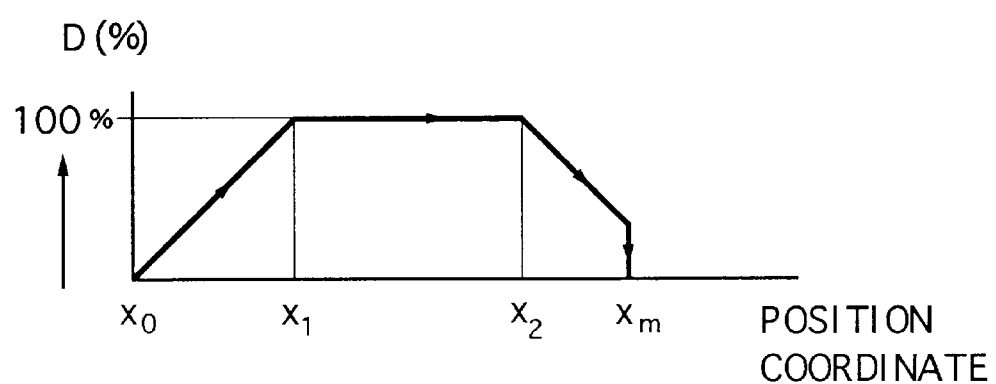
Figure 7:
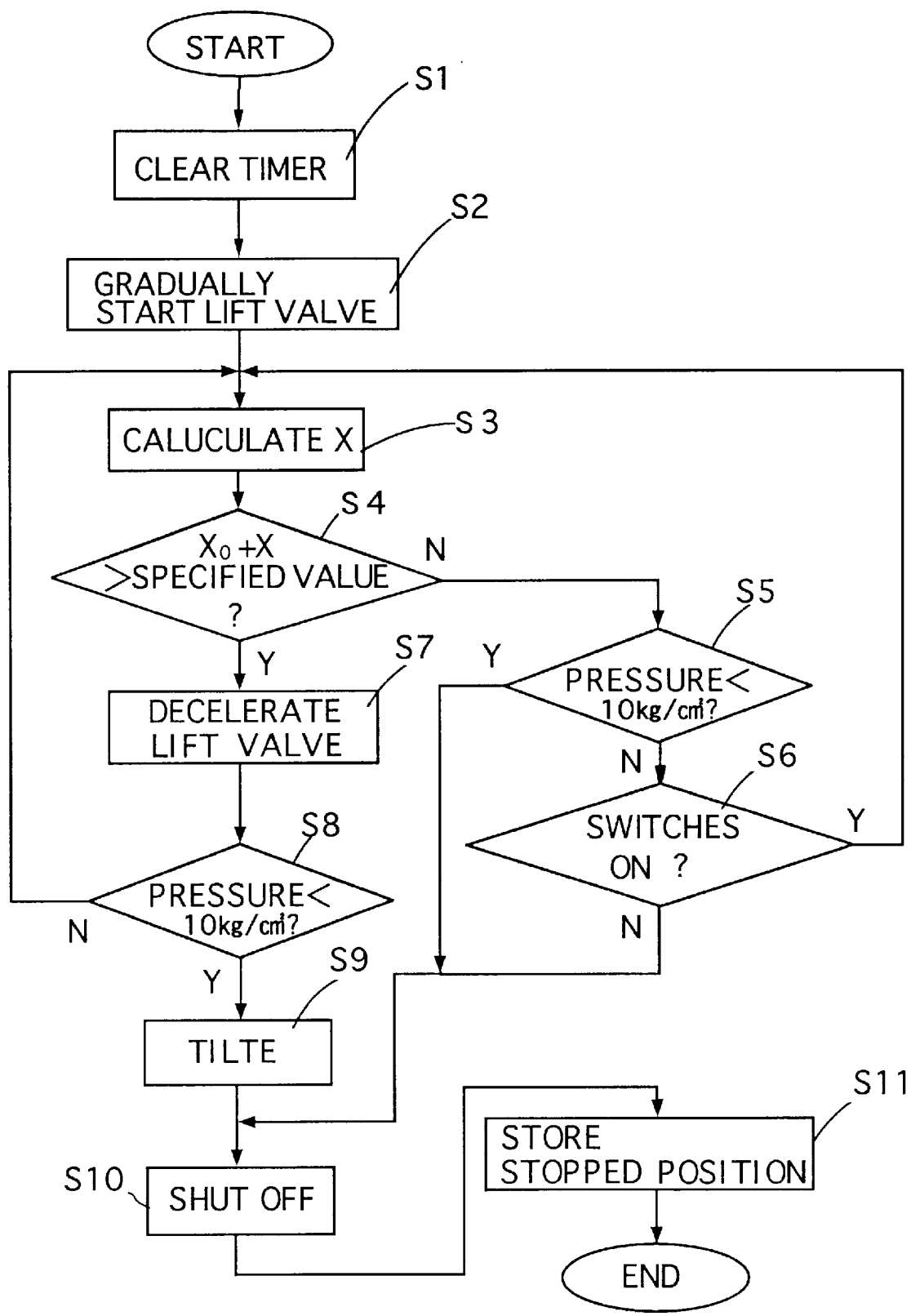
FIG. 7 is a flow chart for the control of a downward motion of the tail gate.
Figure 8:
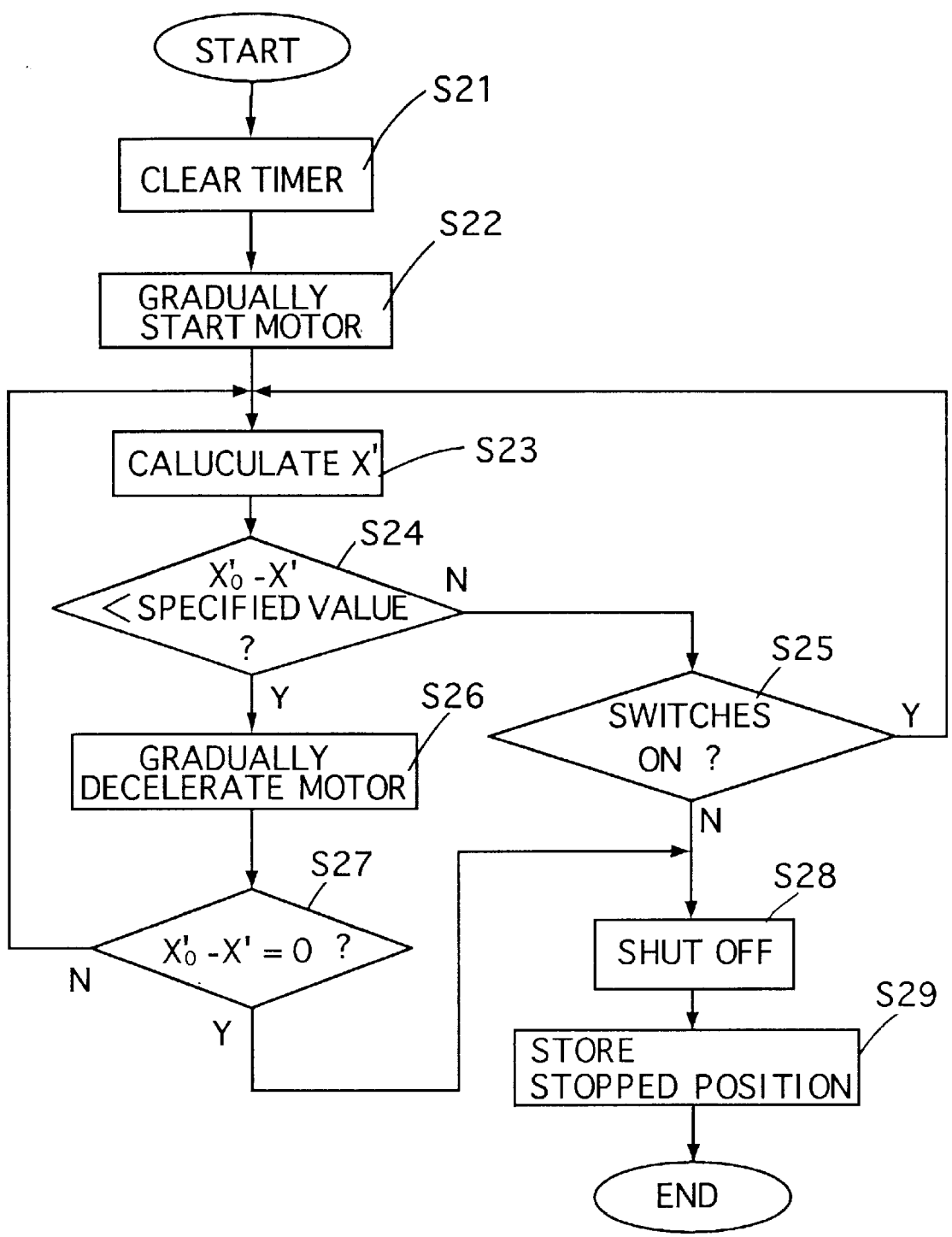
FIG. 8 is a flow chart for the control of an upward motion of the tail gate.

FIG. 5C illustrates Steps S2 and S7 of FIG. 7, with $x_0$ indicating the initial coordinate of the tail gate, as explained above. As the duty ratio is increased in Step S2, the tail gate gradually moves downward, $x_1$ indicating the coordinate of the tail gate when the duty ratio eventually reaches 100%. The coordinate of the position of which the specified value is compared in Step S4 is indicated by $x_2$. The arrival of the tail gate at this position is detected by signals from the timer, and the duty ratio is reduced steadily (Step S7). After the contact of the tail gate with the ground is ascertained in Step S8 and the tail gate is completely stopped in Step S10, the coordinate $x_m$ of the tail gate at this moment is stored (Step S11).

Figure 6A:
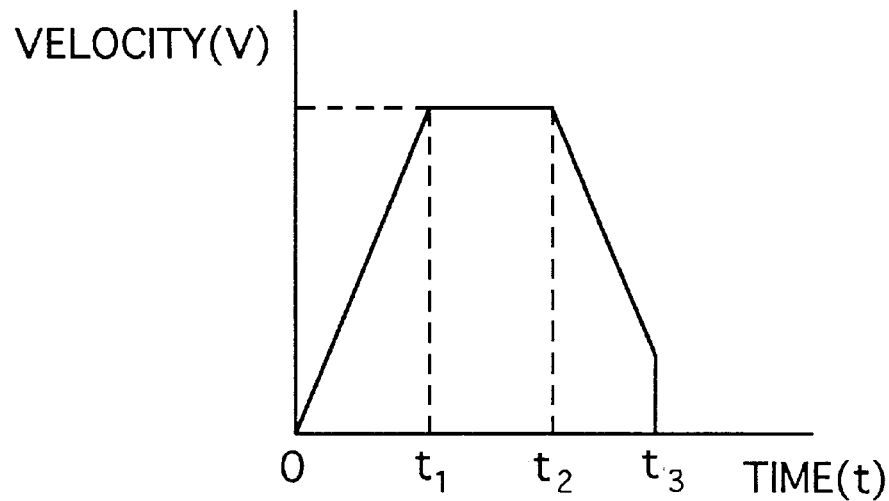
FIGS. 6A and 6B are graphs showing the changes in the velocity of the tail gate when it is moved up and down according to a control method of this invention.

Step S3 of FIG. 7 is explained still further with reference to FIG. 6A which is a graph showing the time-rate of change in the speed of the tail gate as it is lowered as described above. In Step S3, the controller responds to the clock signal from the timer while monitoring the pressure and the duty ratio of the lift valve. As explained above, the duty ratio corresponds to the cross-sectional area of the lift valve during this lowering motion of the tail gate. Thus, the flow rate of the oil at each time t of the clock signal can be calculated from this cross-sectional area and the pressure. Since the oil is a non-compressible fluid, a continuity relationship holds, relating the cross-sectional area and flow rate along a flow route. By using both this continuity relationship and Bernouille's equation relating pressure and speed of flow, the downward speed v of the tail gate can be calculated from this flow rate and pressure, or uniquely from the duty ratio and the measured pressure inside the lift valve. Once this time-rate of change in the velocity is thus determined as shown in FIG. 6A, the distance x traveled by the tail gate (along its trajectory) can be accurately calculated as the area below the line in this graph by integration. Since the initial coordinate $x_0$ is stored, as explained above, the present coordinate of the tail gate can also be determined accurately as $x_0+x$. From time $t_1$ to time $t_2$, FIG. 6A shows that the tail gate moves at a constant speed. Between time $t_2$ and $t_3$, the speed is reduced at a constant rate, the tail gate reaching the ground and resting on the ground after time $t_3$.

As may be clear from the description above, one of distinguishing characteristics of the method according to this invention is that the period of opening and closing the valve is changed such that the motion of the tail gate is started and ended gradually. Another characteristic is that the position coordinate of the tail gate is accurately monitored such that the timing for starting and stopping the tail gate gradually can be accurately determined. A still further characteristic is that the system as a whole can be stopped by detecting the contact of the tail gate with the ground.

The upward motion of the tail gate is controlled similarly. For the completeness of disclosure, however, this will be described next with reference to FIGS. 8, 5D and 6B but detailed explanations will be omitted. Let us assume for the convenience of illustration that the tail gate is initially at the grounded position shown at (b) in FIG. 3, that is, at its tilted-up (horizontal) orientation.

As the external switches are switched on and the timer is cleared, the main valve and the lift valve are opened (Step S21) and the duty ratio is gradually increased such that the speed of rotation of the motor increases gradually (Step S22). Signals from the pressure sensor and the duty ratio are monitored in synchronism with the clock signals from the timer, and the distance x' traveled by the tail gate is calculated (Step S23). If the earlier stored initial position coordinate of the tail gate is $x_0'$ (a negative number), $x_0'-x'$ represents the new position coordinate of the tail gate, and this is compared with a specified value ($x_1'$), or the coordinate of a specified position of the tail gate (Step S23). If the comparison shows that the tail gate has not reached this specified position (NO in Step S24), Steps S23 and S24 are repeated, unless either of the external switches has been switched off (YES in Step S25). If the comparison shows that the tail gate has already passed this specified position (YES in Step S24), the duty ratio is reduced such that the motor is slowed down (Step S26) until the value of $x_0'-x'$ being calculated reaches zero, meaning that the tail gate has reached the highest position indicated by (a) in FIG. 3 (YES in Step S27). The lift valve and the main valve are then closed, the system is shut down (Step S28) and the position coordinate $x_m'$ at this stopped position is stored by the CPU (Step S29).

Figure 5D:
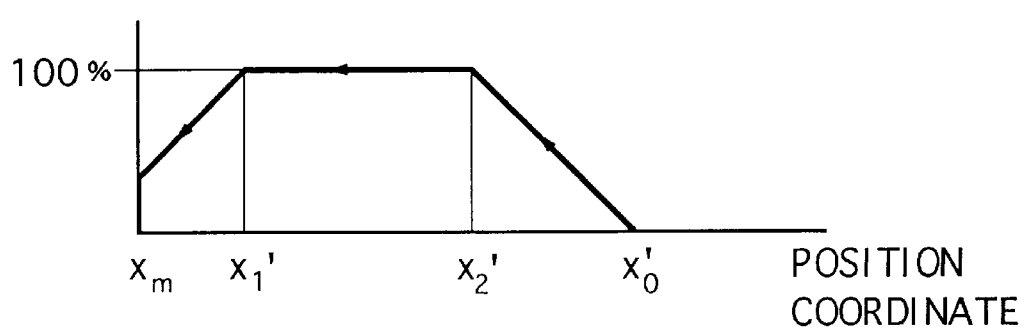
Figure 6B:
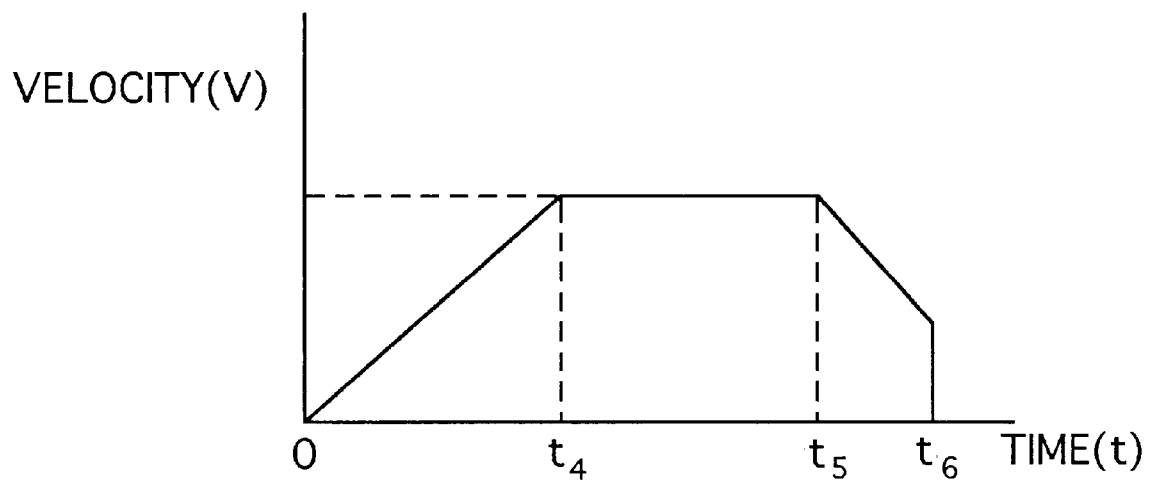

FIG. 5D shows the relationship between the duty ratio and the position coordinate of the tail gate and FIG. 6B shows the relationship between the velocity of the tail gate and time during the upward motion of the tail gate described above with reference to FIG. 8. The time and position at which the duty ratio reaches 100% in Step S22 are indicated by $t_4$ and $x_2'$, respectively, and the time at which the position coordinate of the tail gate reaches $x_1'$ is indicated by $t_5$. The time at which the tail gate is determined to have reached the top (YES in Step 27) is indicated by $t_6$.

Figure 9:
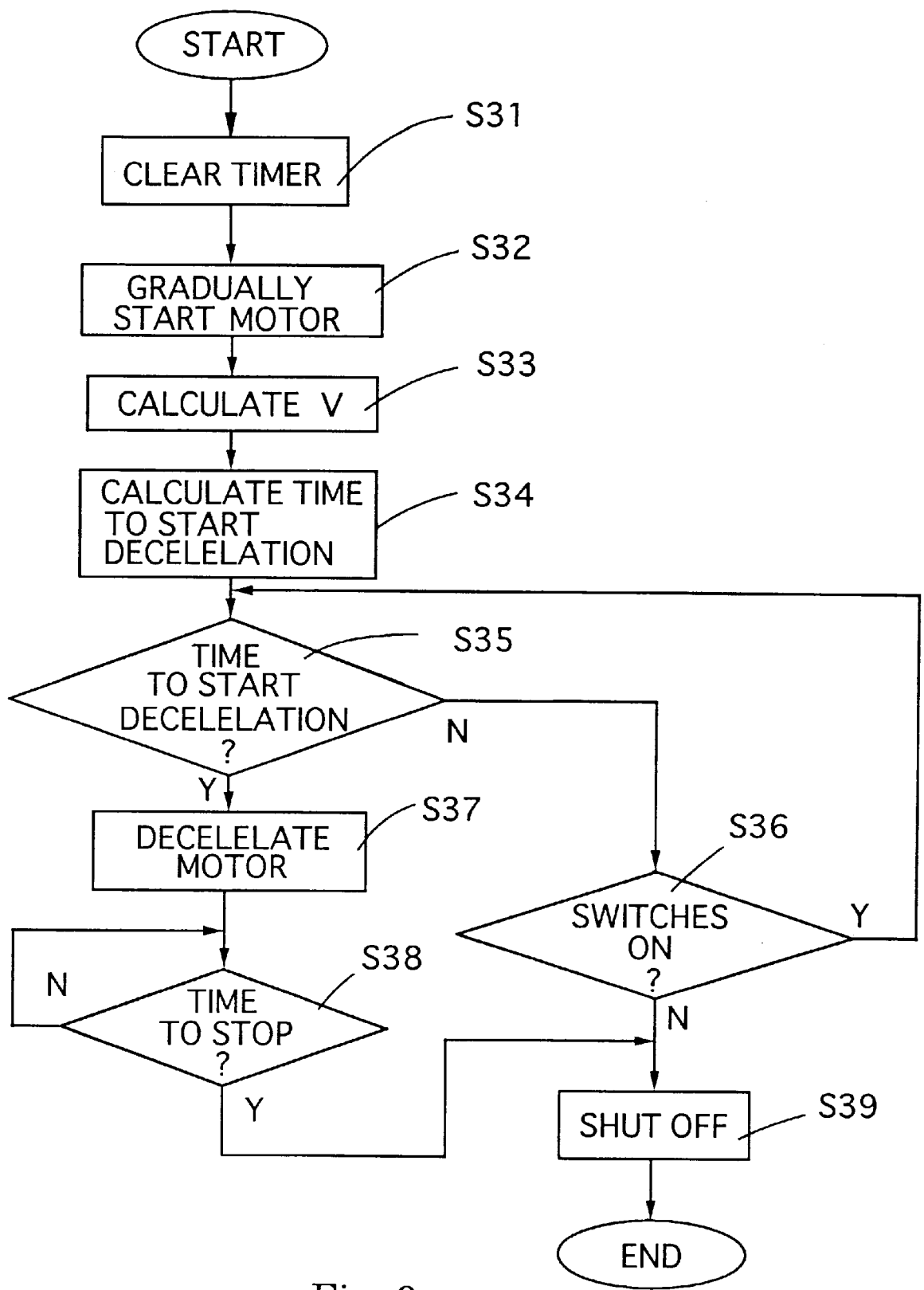
FIG. 9 is a flow chart for the control according to another embodiment of the invention for lifting the tail gate.

FIG. 9 shows another control method embodying this invention for upwardly moving a similarly structured lift as described above. As explained above with reference to FIG. 8, the process starts with the external switches being switched on and the timer being cleared such that the main valve and the lift valve are opened (Step S31), and the duty ratio is gradually increased such that the speed of rotation of the motor increases gradually (Step S32). Unlike the method illustrated in FIG. 8, however, the controller thereafter calculates the velocity v of the tail gate by monitoring the signals from the pressure sensor and the duty ratio in synchronism with the clock signals from the timer (Step S33). The velocity v can be calculated exactly as explained above with reference to FIG. 8, and hence will not be repeated. From the instantaneous speed v of the tail gate thus obtained, the time to start decelerating and the time to stop the motion of the tail gate are calculated (Step S34), and this is continued until the time to decelerate has been reached (NO in Step S35) as long as both of the external switches remain switched on (YES in Step S36). If the time to decelerate has been reached (YES in Step S35), the duty ratio is reduced to slow down the rotary motion of the motor (Step S37), and this is continued as long as the time to stop calculated above has not been reached (NO in Step S38). When the time to stop has been reached (YES in Step S38), the lift valve and the main valve are closed and the system as a whole is shut down (Step S39). It now goes without saying that the time to decelerate and the time to stop can be determined graphically from FIG. 6B because the distance traveled by the tail gate can be determined by measuring the area in the graph under the line.

One of distinguishing characteristics of this method is that gradual starting and gradual stopping of the tail gate are controlled by varying the voltage applied to the motor. The method is also characterized in that the timing for deceleration and stopping can be accurately determined by monitoring the speed of travel by the tail gate and calculating the decelerating and stopping times therefrom and that the arrival of the tail gate at the highest position is detected in terms of the time of travel.

The methods of control described above can be applied for different modes of operation of the tail gate. For moving the unloaded tail gate downward until it reaches the ground, loading it with freight and lifting it back to the highest position, the lift valve is controlled first by varying the duty ratio of the lift valve such that the tail gate begins to move downward slowly. The initial position coordinate of the tail gate $x_0$ is set equal to zero, and the distance x traveled from the starting position is calculated. When the calculated distance x exceeds a specified value such as 100 cm, the duty ratio for the control of the lift valve is reduced such that the tail gate begins to decelerate. Its contact with the ground is detected by the drop in pressure inside the lift valve below a certain critical value such as 10 kg/cm$^2$. Thereafter, the tail gate is tilted forward, the system is shut down and the final position coordinate $x_m$ (representing the maximum distance of travel between the highest and lowest points on the trajectory of the tail gate) is stored. After freight is loaded on the tail gate, the timer is cleared and the valves are opened, and the duty ratio for the motor is controlled such that the tail gate starts moving upward gradually. The distance of travel x' is calculated, and the position of the tail gate is determined from this distance of travel x' and the initial position coordinate of this upward motion which is the same as the final position coordinate $x_m$ of the downward motion. When the current position coordinate $x_m$-x' becomes less than a specified value such as 50 cm, the duty ratio of the motor is changed again such that the rotary motion of the motor and the speed of the tail gate are slowed down. When the tail gate reaches the highest position of its trajectory where its position coordinate becomes zero, the entire system is shut down, and the calculated position coordinate $x_m'$ (which should be zero) of the tail gate at this moment is stored. In other words, the initial position coordinate of the tail gate, which was earlier stored, is updated every time the system is stopped.

For lowering the unloaded tail gate from its highest position to a specified intermediate position, loading it with freight there, and lifting it again back to the highest position, the process is started similarly as described above by controlling the duty ratio for the lift valve to slowly beginning to move the tail gate downward. The distance x traveled by the tail gate is calculated as above and when the value of x reaches a certain value (before the tail gate reaches the specified intermediate position), the duty ratio is changed again such that the speed of the tail gate is reduced. The user operates either of the external switches to stop the tail gate at the desired intermediate position. The coordinate $x_m$ of this intermediate position where the tail gate is stopped is stored. After the tail gate is loaded with freight at this intermediate position, the timer is cleared again, the valves are opened and the duty ratio of the motor is gradually increased such that the tail gate starts moving upward gradually. The distance x' traveled in this upward motion is calculated, and the position coordinate of the tail gate is obtained from this distance x' and the initial position coordinate for this upward motion, which is the same as the finally stored coordinate $x_m$ of the previous downward motion. When the position coordinate (calculated as $x_m$-x') reaches a certain value such as 30 cm, indicating that the tail gate is now near the highest position where it is to be stopped, the duty ratio of the motor is reduced such that the tail gate is decelerated. As it reaches the highest position and its calculated position coordinate becomes zero, the system is shut down and the position coordinate $x_m'$ indicative of the position where the tail gate stopped (which is zero) is stored, to be used as the initial coordinate when the control system is switch on next.

For lowering the unloaded tail gate from its highest position to a specified intermediate position, loading it with freight there, still lowering it until it rests on the ground, loading it again with another freight, and lifting it again back to the highest position, the process is started similarly as described above until the loading of the freight at the intermediate height is finished. For continuing its downward motion, the timer is cleared and the main valve is opened. The duty ratio is increased from zero to gradually start the downward motion of the tail gate. The controller keeps calculating the position coordinate of the tail gate as explained above by setting as its initial coordinate the final coordinate value of the tail gate when it was stopped at the aforementioned intermediate position. The control for the rest of the motions is the same as explained above.

According to this invention, the motion of a tail gate can be accurately controlled independently of the weight of the load and the motion can be started and stopped gently. Damage to the cargo and to the tail gate itself can thereby reduced significantly. It should also be noted that the control according to this invention can be accomplished without using any complicated apparatus, thereby reducing the space occupied by the system as well as its cost.

What is claimed is:

1. A control system for a lift attached to a vehicle, said lift comprising a tail gate supported by at least one hydraulic lift cylinder for causing said tail gate to undergo a translational motion upward and downward as a whole and by at least one hydraulic tilt cylinder for rotating said tail gate between an opened position and a closed position, said control system comprising:

a power unit including a hydraulic pump, an electric motor for operating said hydraulic pump, and valve means for selectably allowing or not allowing transport of a hydraulic liquid into said hydraulic cylinders by said hydraulic pump;

a pressure sensor for measuring the pressure inside said hydraulic lift cylinder;

at least one external switch;

a timer, and a controller serving to transmit output signals to said motor and to said valve means in response to input signals from said sensor said timer and said external switch, said controller having a signal generating device for generating a rectangular wave signal in response to an input signal received from said pressure sensor and said timer, a semiconductor switch which switches on and off in synchronism with said rectangular wave signal, said controller being capable of changing the duty ratio of said rectangular wave signal to thereby start and stop said translational motion gradually.

2. The control system of claim 1 wherein said valve means include:

a main valve between said hydraulic pump and each of said hydraulic cylinders;

a tilt valve disposed between said main valve and said tilt cylinder; and a lift valve disposed between said main valve and said lift cylinder.

3. In combination with a lift comprising a tail gate supported by at least one hydraulic lift cylinder for causing said tail gate to undergo a translational motion upward and downward as a whole and by at least one hydraulic tilt cylinder for rotationally opening and closing said tail gate, a controller for controlling the speed of said tail gate in said translational motion, said lift having a hydraulic pump. and an electric motor for operating said hydraulic pump, and valve means for selectably allowing or not allowing transport of a hydraulic liquid into said hydraulic cylinders by said hydraulic pump, said controller comprising:

a signal generating device for generating a rectangular wave signal in response to an input signal received from a pressure sensor and a timer; and a semiconductor switch which switches on and off in synchronism with said rectangular wave signal, said controller being capable of changing the duty ratio of said rectangular wave signal to thereby control the speed of said valve and said motor.

4. In combination with a lift comprising a tail gate supported by at least one hydraulic lift cylinder for causing said tail gate to undergo a translational motion upward downward as a whole and by at least one hydraulic tilt cylinder for rotationally opening and closing said tail gate, a method of controlling a downward movement of said tail gate in said translational motion, said method comprising the steps of:

gradually starting said downward movement of said tail gate and gradually accelerating said tail gate in said downward movement;

determining the position of said tail gate on real time as a one-dimensional position coordinate with respect to a reference position; and gradually decelerating said tail gate in said downward movement after said position coordinate of said tail gate passes a pre-determined value, the step of real-time determination comprising the step of determining the position of said tail gate on the basis of the pressure inside and the duty ratio of a valve connected to said lift cylinder.

5. The method of claim 4 wherein said step of real-time determination comprises the steps of;

calculating the flow rate of oil from one of oil chambers of said lift cylinder from said pressure and said duty ratio;

calculating the speed of said tail gate in said downward movement from said flow rate;

calculating the distance travelled by said tail gate in said downward movement from a curve which relates said calculated speed of said tail gate with time; and calculating the current position coordinate of said tail gate from the position coordinate of said reference position which has been stored and said calculated distance.

6. The method of claim 4 wherein said steps of gradually starting, accelerating and decelerating are effected by changing the duty ratio of a valve connected to said lift cylinder.

7. The method of claim 4 further comprising the steps of stopping said downward movement when the pressure inside said lift cylinder becomes less than a specified value and thereafter causing said tail gate to be gradually tilted.

8. In combination with a lift comprising a tail gate supported by at least one hydraulic lift cylinder for causing said tail gate to undergo a translational motion upward and downward as a whole and by at least one hydraulic tilt cylinder for rotationally opening and closing said tail gate, a method of controlling an upward movement of said tail gate in said translational motion, said method comprising the steps of:

gradually starting said upward movement of said tail gate and gradually accelerating said tail gate in said upward movement;

determining the position of said tail gate on real time as a one-dimensional position coordinate with respect to a reference position;

gradually decelerating said tail gate in said upward movement when said position coordinate of said tail gate reaches a pre-determined value; and stopping said downward movement of said tail gate while decelerating, the step of real-time determination comprising the step of determining the position of said tail gate on the basis of the pressure inside said lift cylinder and duty ratio of a motor for driving a hydraulic pump to transport a hydraulic liquid into said lift cylinder.

9. The method of claim 8 wherein said step of real-time determination comprises the steps of:

calculating the speed of said tail gate in said upward movement from said pressure of said valve and said duty ratio;

calculating the distance travelled by said tail gate in said upward movement from said calculated speed of said tail gate; and calculating the current position coordinate of said tail gate from the position coordinate of said reference position which has been stored and said calculated distance.

10. The method of claim 8 wherein said steps of gradually starting, accelerating and decelerating are effected by changing the voltage applied to a motor which drives a hydraulic pump for transporting a hydraulic liquid into said lift cylinder.

11. In combination with a lift comprising a tail gate supported by at least one hydraulic lift cylinder for causing said tail gate to undergo a translational motion upward and downward as a whole and by at least one hydraulic tilt cylinder for rotationally opening and closing said tail gate, a method of controlling an upward movement of said tail gate in said translational motion, said method comprising the steps of:

gradually starting said upward movement of said tail gate and gradually accelerating said tail gate in said upward movement;

determining a start-decelerating time and a stopping time from the position and speed of said tail gate;

beginning to gradually decelerate said tail gate in said upward movement when said start-decelerating time is reached; and stopping while decelerating said tail gate in said upward movement when said stopping time is reached, said time-determining step time comprising the step of determining a start-decelerating time and a stopping time on the basis of inside pressure within said lift cylinder and the duty ratio of a motor for driving a hydraulic pump to transport a hydraulic liquid into said lift cylinder.

12. The method of claim 11 wherein said time-determining step comprises the steps of:

calculating the speed of said tail gate from said inside pressure and said duty ratio;

calculating the distance travelled by said tail gate in said upward movement from said calculated speed of said tail gate with time;

calculating the current position coordinate of said tail gate with respect to a reference position from said calculated distance and a preliminarily stored position coordinate of a starting position of said upward movement; and calculating a travel time required for said tail gate to travel from said calculated current position coordinate to a specified position.

13. The method of claim 11 wherein said steps of gradually starting, accelerating and decelerating are effected by changing the voltage applied to a motor which drives a hydraulic pump.

* * * * *